United States Patent
Park et al.

(10) Patent No.: US 12,090,725 B2
(45) Date of Patent: Sep. 17, 2024

(54) PRESSURE DEVICE, BATTERY MODULE MANUFACTURING DEVICE, AND MANUFACTURING METHOD

(71) Applicant: LG ENERGY SOLUTION, LTD., Seoul (KR)

(72) Inventors: Geon-Tae Park, Daejeon (KR); Young-Seok Song, Daejeon (KR); Suk-Hoon Lee, Daejeon (KR); Choon-Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 275 days.

(21) Appl. No.: 17/770,422

(22) PCT Filed: Jul. 26, 2021

(86) PCT No.: PCT/KR2021/009673
§ 371 (c)(1),
(2) Date: Apr. 20, 2022

(87) PCT Pub. No.: WO2022/025576
PCT Pub. Date: Feb. 3, 2022

(65) Prior Publication Data
US 2022/0388266 A1 Dec. 8, 2022

(30) Foreign Application Priority Data
Jul. 27, 2020 (KR) .................. 10-2020-0093366

(51) Int. Cl.
*B30B 15/06* (2006.01)
*H01M 10/613* (2014.01)
(Continued)

(52) U.S. Cl.
CPC .......... *B30B 15/061* (2013.01); *H01M 10/613* (2015.04); *H01M 10/643* (2015.04);
(Continued)

(58) Field of Classification Search
CPC ... B30B 15/061; B30B 15/068; B30B 15/067; B30B 15/06; H01M 10/613;
(Continued)

(56) References Cited

U.S. PATENT DOCUMENTS

| 2010/0024667 A1 | 2/2010 | Ikura |
| 2016/0197315 A1 | 7/2016 | Tatsumi et al. |

(Continued)

FOREIGN PATENT DOCUMENTS

| CN | 101640167 A | 2/2010 |
| CN | 110998908 A | 4/2020 |

(Continued)

OTHER PUBLICATIONS

Machine Translation of KR 10 1721290 B1 (EPO/Google) (Year: 2024).*

(Continued)

*Primary Examiner* — Cynthia L Schaller
(74) *Attorney, Agent, or Firm* — Birch, Stewart, Kolasch & Birch, LLP

(57) ABSTRACT

Discussed is a pressing apparatus for pressing a plurality of battery cells, the pressing apparatus including a pressing jig including a support plate, and a plurality of pressing rods respectively disposed on a first side of the support plate and located to respectively face the plurality of battery cells, the plurality of pressing rods being configured to respectively press the plurality of battery cells and to adjust to sonic of the plurality of battery cells that are not level during pressing; and a transfer unit disposed on a second side of the support plate and having a transfer jig configured to transfer the support plate towards the plurality of battery cells.

14 Claims, 11 Drawing Sheets

(51) Int. Cl.
*H01M 10/643* (2014.01)
*H01M 10/6554* (2014.01)
*H01M 50/213* (2021.01)
*H01M 50/264* (2021.01)

(52) U.S. Cl.
CPC ..... *H01M 10/6554* (2015.04); *H01M 50/213* (2021.01); *H01M 50/264* (2021.01)

(58) Field of Classification Search
CPC .......... H01M 10/643; H01M 10/6554; H01M 50/213; H01M 50/264; H01M 10/0404; H01M 10/0481; H01M 50/20; H01M 10/0422; H01M 50/258; H01M 10/6551; Y02E 60/10; Y02P 70/50
See application file for complete search history.

(56) References Cited

U.S. PATENT DOCUMENTS

| | | | |
|---|---|---|---|
| 2020/0006728 A1 | 1/2020 | Park et al. | |
| 2020/0166422 A1 | 5/2020 | Mori | |
| 2020/0243815 A1 | 7/2020 | Imai et al. | |

FOREIGN PATENT DOCUMENTS

| | | | |
|---|---|---|---|
| CN | 210706201 | U | 6/2020 |
| JP | 2006-149890 | A | 8/2005 |
| JP | 2007-67273 | A | 3/2007 |
| JP | 2007-294607 | A | 11/2007 |
| JP | 2015-181699 | A | 11/2015 |
| KR | 10-2010-0018173 | A | 2/2010 |
| KR | 10-2015-0043727 | A | 4/2015 |
| KR | 10-2016-0034676 | A | 3/2016 |
| KR | 10-1676407 | B1 | 11/2016 |
| KR | 19-1721280 | B1 | 4/2017 |
| KR | 10-2016-0009701 | A | 1/2018 |
| KR | 10-2019-0031854 | A | 3/2018 |
| KR | 10-2018-0038181 | A | 4/2018 |
| KR | 10-2019-0051300 | A | 8/2019 |

OTHER PUBLICATIONS

Extended European Search Report for European Application No. 21849682.6, dated Jun. 19, 2023.
International Search Report (PCT/ISA/210) issued in PCT/KR2021/009673, dated Nov. 22, 2021.

\* cited by examiner

PRESSURE DEVICE, BATTERY MODULE MANUFACTURING DEVICE, AND MANUFACTURING METHOD

TECHNICAL FIELD

The present disclosure relates to a pressing apparatus, a device for manufacturing a battery module, and a method for manufacturing a battery module, and more particularly, to a pressing apparatus for improving durability of a battery module by manufacturing the battery module so that the thickness of an adhesive used to fix a plurality of cylindrical battery cells is constant, a device for manufacturing a battery module, and a method for manufacturing a battery module.

The present application claims priority to Korean Patent Application No. 10-2020-0093366 filed on Jul. 27, 2020 in the Republic of Korea, the disclosures of which are incorporated herein by reference.

BACKGROUND ART

Recently, with the rapid increase in demand for portable electronic products such as laptop computers, video cameras, and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

In addition, a battery module includes a plurality of battery cells that are secondary batteries as above. Here, since the battery cells generate heat during charging and discharging of the battery module, it is an important factor to effectively discharge the generated heat to the outside in order to improve the lifespan and stability of the battery module. To this end, in general, the plurality of cylindrical battery cells are cooled using a heatsink configured to circulate a refrigerant therein.

FIGS. 1 and 2 are front views schematically showing a conventional pressing apparatus in operation. Also, FIG. 3 is a partial front view schematically showing a part of the conventional pressing apparatus.

Referring to FIGS. 1 to 3, a conventional pressing apparatus 10 is configured to downwardly press a plurality of cylindrical battery cells 200 bonded to a surface (an outer surface) of a heatsink 300 or the like to which the plurality of cylindrical battery cells 200 are mounted by using an adhesive 400. At this time, the pressing apparatus 10 simultaneously presses the plurality of cylindrical battery cells 200 in a downward direction by an integral pressing plate 1a extending in a horizontal direction.

However, as shown in FIG. 3, when the surface of the heatsink 300 is not flat in the horizontal direction but has a step D in an upper and lower direction or has a slope K, the pressing plate 1a is inhibited by a cylindrical battery cell 200 located the highest side. Thus, the pressing plate 1a is not able to press a cylindrical battery cell 200b located at a lower side among the plurality of cylindrical battery cells 200, or presses only one side of the upper portion of the cylindrical battery cell 200a inclined at a predetermined angle Q, thereby making it difficult to uniformly press all of the plurality of cylindrical battery cells 200.

Accordingly, when the conventional pressing apparatus 10 is used, the plurality of cylindrical battery cells 200 are not pressed evenly, so that the thickness of an adhesive 400 applied to the plurality of cylindrical battery cells 200 is not uniformly formed. Due to the adhesive 400 with non-uniform thickness as above, the heat transfer efficiency for transferring the heat generated from the plurality of cylindrical battery cells 200 to the heatsink 300 becomes non-uniform. Thus, during charging and discharging of the manufactured battery module, due to a heat island phenomenon or temperature imbalance of the plurality of cylindrical battery cells 200, the battery cells are degraded, thereby reducing the lifespan of the battery module.

DISCLOSURE

Technical Problem

The present disclosure is designed to solve the problems of the related art, and therefore the present disclosure is directed to providing a pressing apparatus for improving durability of a battery module by manufacturing the battery module so that the thickness of an adhesive used to fix a plurality of cylindrical battery cells is constant, a device for manufacturing a battery module, and a method for manufacturing a battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a pressing apparatus for pressing a plurality of battery cells bonded by an adhesive, comprising: a pressing jig including a support plate, and a plurality of pressing rods respectively connected to one side of the support plate and located to respectively face the plurality of battery cells, the plurality of pressing rods being configured to respectively press the plurality of battery cells and to be partially deformed during pressing; and a transfer unit connected to the other side of the support plate and having a transfer jig configured to transfer the support plate toward the plurality of battery cells.

The pressing rod may include a bolt portion having one side fixed to the support plate; and a pressing portion configured to be coupled with the other side of the bolt portion.

The pressing portion may further include an elastic member configured to be elastically deformed in a direction opposite to the pressing direction, when the battery cell is pressed.

The elastic member may be positioned at a part of the pressing portion pressing the battery cell so as to press the battery cell directly.

The transfer unit may be configured such that an end of the elastic member in the pressing direction is moved in the pressing direction further to the location of a pressing surface of the battery cell.

The pressing portion may be configured to rotate along a slope of a pressing surface of the pressed battery cell, when the battery cell is pressed.

The bolt portion may have a spherical shape in a part coupled with the pressing portion, and the pressing portion may be coupled to rotate along an outer surface of the spherical shape of the bolt portion.

The elastic member may have an insert groove formed so that a part of the battery cell is inserted therein.

A tapered portion may be formed at an inner surface of the insert groove to guide insertion of the battery cell, when the battery cell is inserted into the insert groove.

The support plate may include an inner space configured to accommodate a part of the pressing rod, and an insert groove opened so that the remaining part of the pressing rod protrudes outward from the inner space.

The pressing rod may include a hanging portion configured to be hung at the insert groove and having a plate shape extending in a horizontal direction; a protruding portion configured to extend toward the battery cell from the hanging portion and protrude from the insert groove toward the battery cell to press an upper portion of the battery cell; and an elastic portion having one end connected to the hanging portion or the protruding portion and the other end connected to an inner surface of the inner space of the support plate and configured to be compressed when the protruding portion presses the battery cell.

The transfer unit may include a plurality of cylinder units configured to transfer the plurality of pressing rods toward the plurality of battery cells, respectively.

The plurality of battery cells may be provided as cylindrical battery cells.

In another aspect of the present disclosure, there is also provided a device for manufacturing a battery module, comprising the pressing apparatus according to the above embodiments.

In another aspect of the present disclosure, there is also provided a method for manufacturing a battery module, comprising: an applying step of applying an adhesive to a portion of a heatsink to which a plurality of battery cells are mounted; an attaching step of attaching a plurality of battery cells to the adhesive applied to the heatsink; and a pressing step of pressing each of the plurality of battery cells toward the adhesive by using the pressing apparatus according to the above embodiments.

Advantageous Effects

According to an embodiment of the present disclosure, since the present disclosure includes the pressing jig having a plurality of pressing rods configured to respectively press the plurality of cylindrical battery cells and configured to be partially deformed during pressing, the plurality of pressing rods may press the cylindrical battery cells independently, compared with the prior art in which the plurality of cylindrical battery cells are pressed using an integrated pressing. Thus, even when there is a surface with a step or slope since the surface of the heatsink is not flat, it is possible to effectively reduce the deviation of the pressing forces of the plurality of pressing rods.

Accordingly, the thickness of the adhesive interposed between each of the plurality of cylindrical battery cells and the heatsink may be more uniform. Ultimately, the uniform thickness of the adhesive may transfer the heat generated from each adhered cylindrical battery cell to the heatsink with similar heat transfer efficiency, thereby securing easy heat management of the battery module and effectively preventing the cylindrical battery cells from being degraded.

In addition, according to another embodiment of the present disclosure, since the pressing rod is rotatably coupled along the outer surface of the spherical part of the bolt portion, it is possible to press the inclined upper surface of the cylindrical battery cell whose upper portion is inclined as a whole along the inclined surface of the heatsink, so that the thickness of the adhesive bonded to the inclined cylindrical battery cell may be uniformly formed. Accordingly, it is possible to prevent the heat dissipation efficiency of the plurality of cylindrical battery cells from becoming non-uniform.

Further, according to still another embodiment of the present disclosure, since the insert groove for accommodating a portion of the cylindrical battery cell is provided to the elastic member, when the elastic member presses the cylindrical battery cell, it is possible to effectively prevent the cylindrical battery cell from slipping. That is, the insert groove of the elastic member may stably hold the upper portion of the cylindrical battery cell. Accordingly, it is possible to effectively reduce the occurrence of defects in the pressing process of the pressing apparatus.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
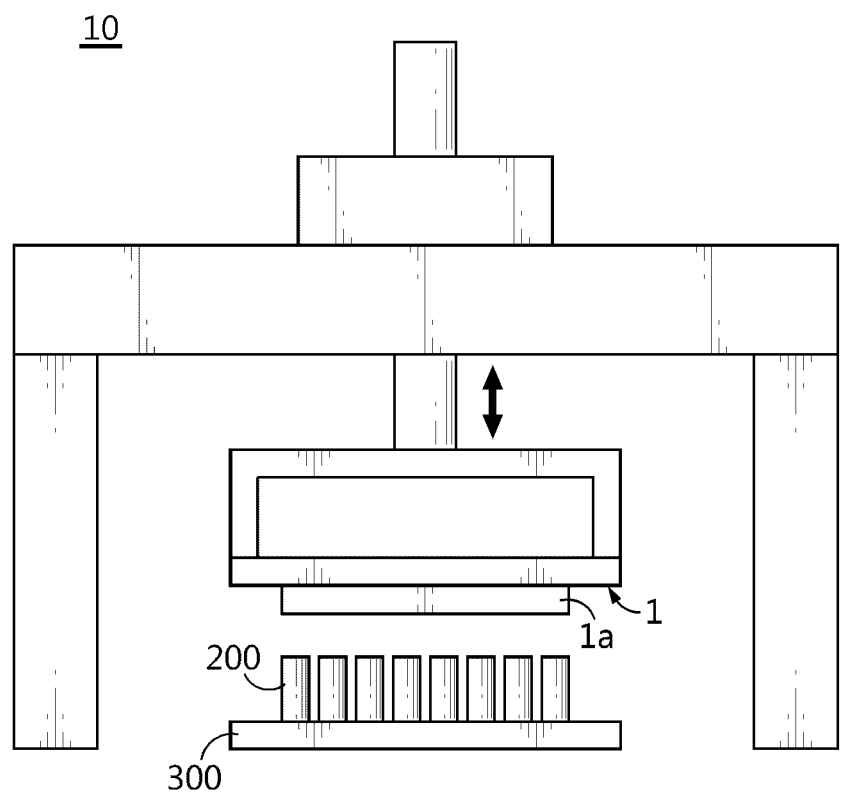
FIGS. 1 and 2 are front views schematically showing a conventional pressing apparatus in operation.
Figure 2:
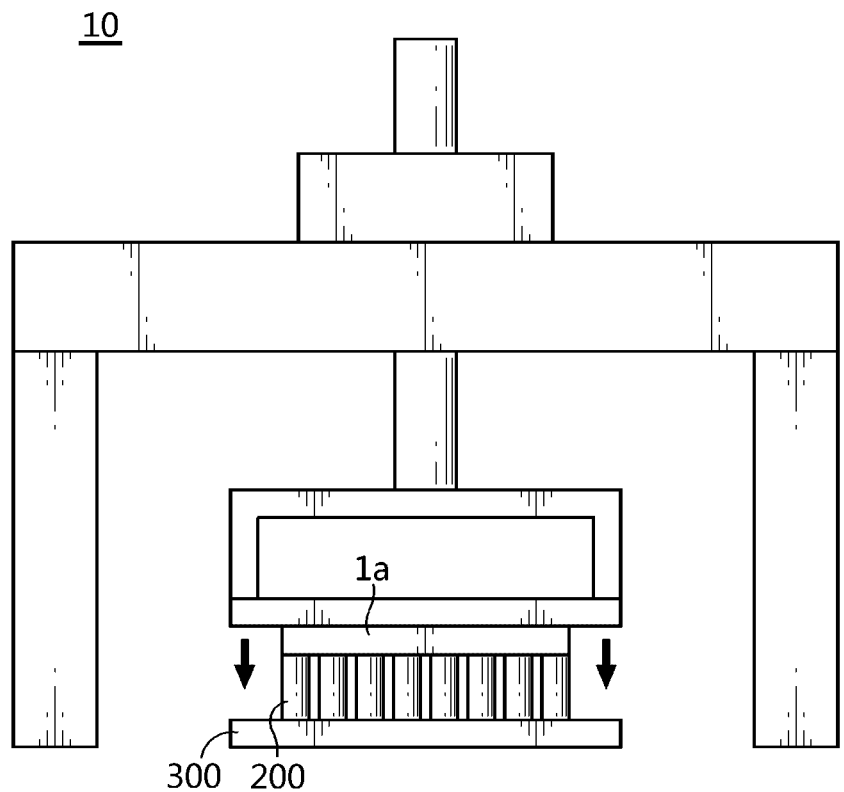
Figure 3:
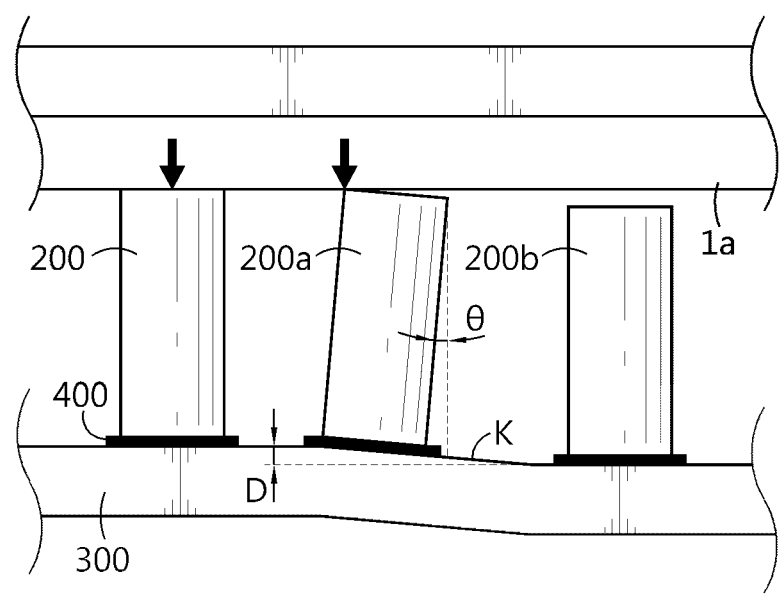
FIG. 3 is a partial front view schematically showing a part of the conventional pressing apparatus.
Figure 4:
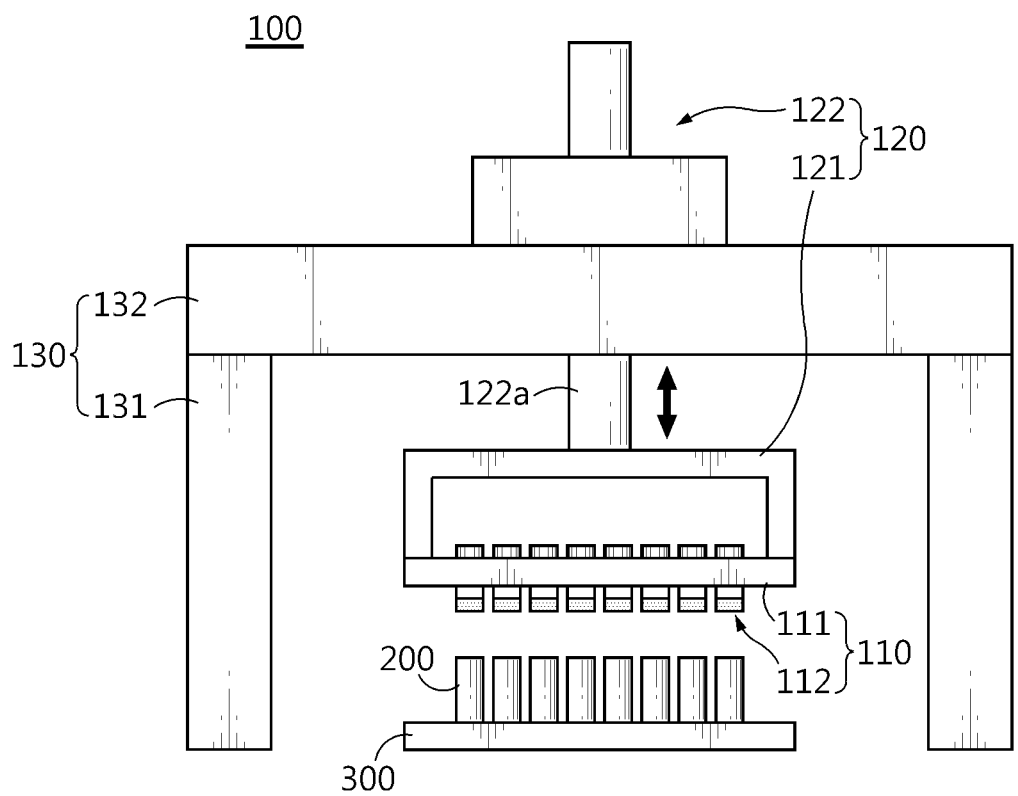
FIG. 4 is a front view schematically showing a pressing apparatus according to an embodiment of the present disclosure.
Figure 5:
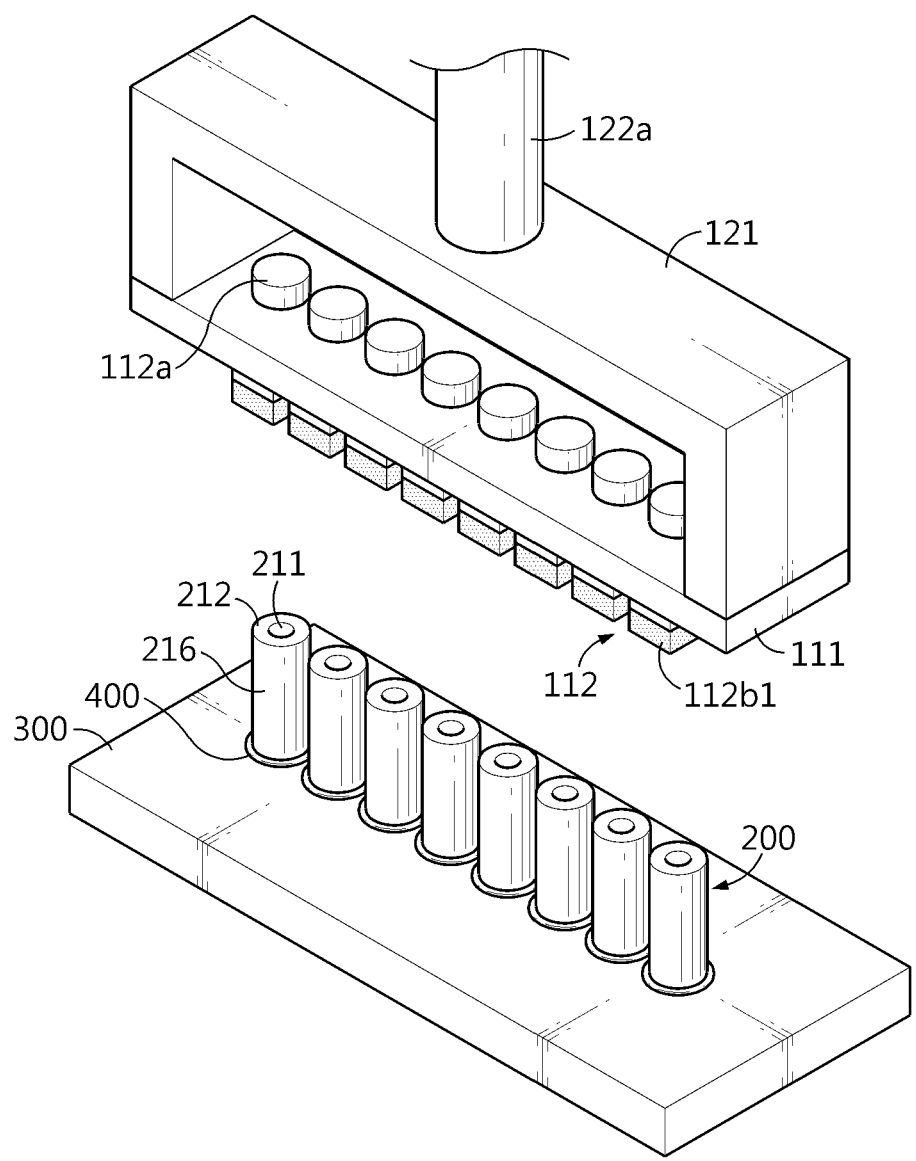
FIG. 5 is a partial perspective view schematically showing a part of the pressing apparatus according to an embodiment of the present disclosure.
Figure 6:
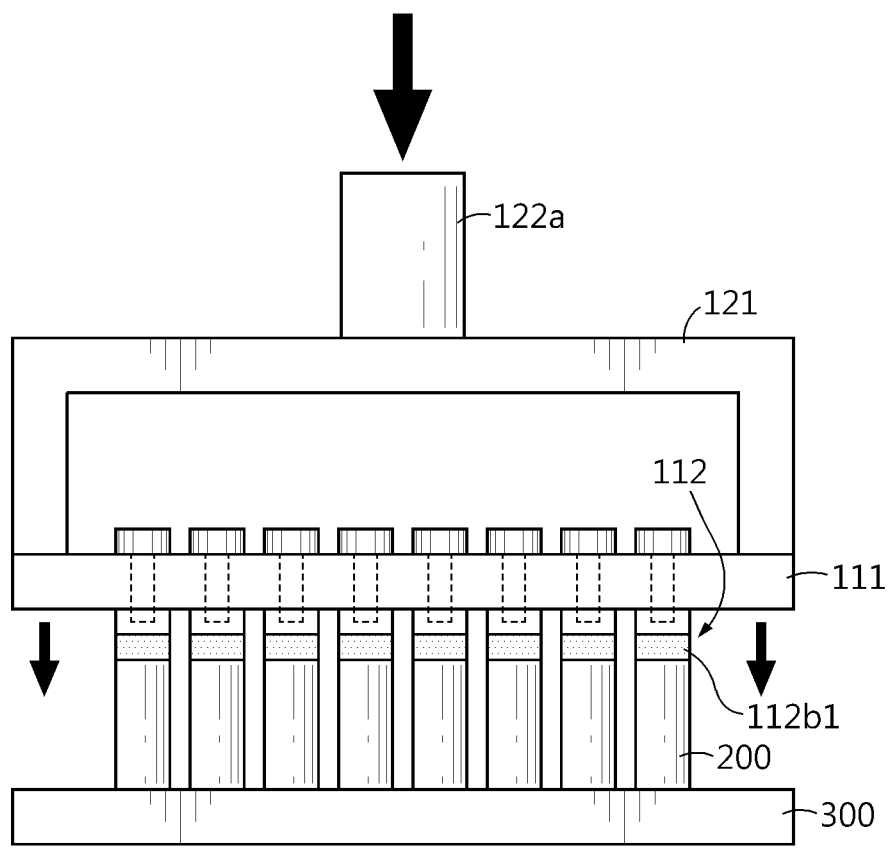
FIG. 6 is a front view schematically showing the pressing apparatus according to an embodiment of the present disclosure in operation.
Figure 7:
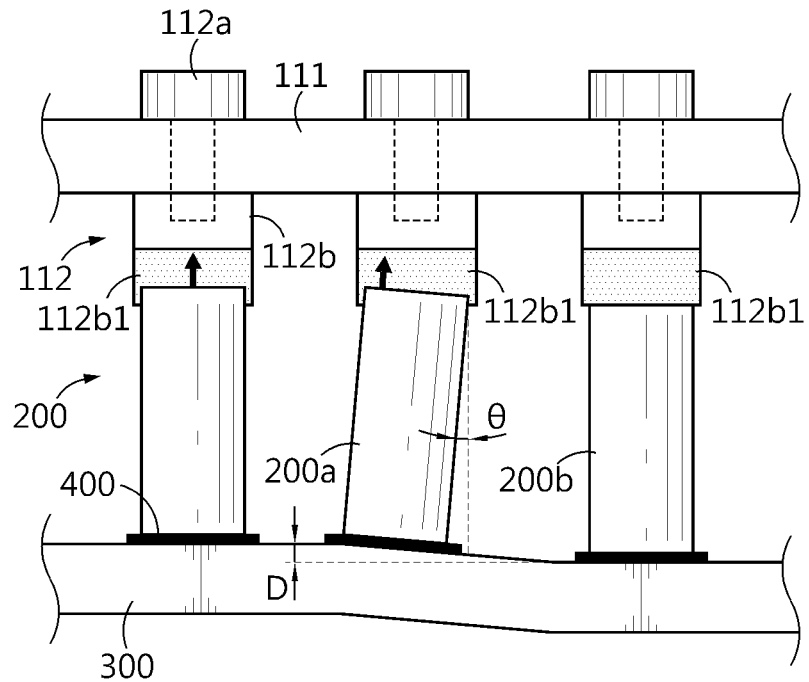
FIG. 7 is a partial perspective view schematically showing a part of a pressing apparatus according to another embodiment of the present disclosure.

FIG. 4 is a front view schematically showing a pressing apparatus according to an embodiment of the present disclosure. FIG. 5 is a partial perspective view schematically showing a part of the pressing apparatus according to an embodiment of the present disclosure. FIG. 6 is a front view schematically showing the pressing apparatus according to an embodiment of the present disclosure in operation. Also, FIG. 7 is a partial perspective view schematically showing a part of a pressing apparatus according to another embodiment of the present disclosure.

Referring to FIGS. 4 to 7, a pressing apparatus 100 according to an embodiment of the present disclosure may be configured to press a plurality of cylindrical battery cells 200 bonded by an adhesive 400. That is, after the adhesive 400 is applied to a location, for example on a surface (an outer surface) of a module case to which the plurality of cylindrical battery cells 200 are mounted or a heatsink 300, the pressing apparatus 100 of the present disclosure may be configured to press toward the adhesive 400 using a pressing jig 110 in a state where the plurality of cylindrical battery cells 200 are respectively attached onto the applied adhesive 400.

Here, the cylindrical battery cell 200 may include a positive electrode terminal 211 and a negative electrode terminal 212 thereon. At this time, the positive electrode terminal 211 may be configured not to protrude upward further to a top end of a battery can 216.

The cylindrical battery cell 200 may include a battery can 216 and an electrode assembly accommodated in the battery can 216. Such components of the cylindrical battery cell 200 are widely known to those skilled in the art at the time of filing of this application and thus will not be described in detail in this specification.

Specifically, the pressing apparatus 100 may include a pressing jig 110 and a transfer unit 120 configured to transfer the pressing jig 110.

Here, the pressing jig 110 may include a support plate 111 and a plurality of pressing rods 112. The support plate 111 may have a plate shape extending in a horizontal direction. The support plate 111 may be configured to be connected to the transfer unit 120. For example, as shown in FIG. 4, both left and right ends of the support plate 111 may be configured to be connected to the transfer unit 120, based on the front view. The support plate 111 may be configured to move in an upper and lower direction by the transfer unit 120.

In addition, each of the plurality of pressing rods 112 may be connected to one side (lower surface) of the support plate 111. The plurality of pressing rods 112 may be positioned to face of the plurality of cylindrical battery cells 200 in the upper and lower direction, respectively. The plurality of pressing rods 112 may be configured to be separated from each other to enable independent movement. For example, an upper portion of each of the plurality of pressing rods 112 may be connected to the support plate 111.

Moreover, the plurality of pressing rods 112 may include a bolt portion 112a and a pressing portion 112b. The bolt portion 112a may be configured to have one side fixed to the support plate 111 and the other side coupled with the pressing portion 112b.

The bolt portion 112a is inserted into a fastening hole of the support plate 111 so that a bolt head thereof may be blocked by the upper surface of the support plate 111 and a part of a bolt body thereof may be fixed inside the fastening hole. A lower part of the bolt portion 112a may be screwed with the pressing portion 112b. The pressing portion 112b may be configured to be partially pressed and deformed by the pressed cylindrical battery cell 200, when pressing the cylindrical battery cell 200.

In addition, the transfer unit 120 may include a transfer jig 121. A lower portion of the transfer jig 121 may be connected to the other side (the upper surface) of the support plate 111. The transfer jig 121 may be configured to transfer the support plate 111 toward the plurality of cylindrical battery cells 200. Also, the transfer jig 121 may be configured to return to its original position after the process of pressing the plurality of cylindrical battery cells 200 is finished.

Further, the transfer unit 120 may further include a pressing cylinder 122. The pressing cylinder 122 may be connected to the transfer jig 121. The pressing cylinder 122 may be configured to move the cylinder shaft 122a in the upper and lower direction. An end of the cylinder shaft 122a may be connected to the transfer jig 121.

The pressing apparatus 100 may further include a column unit 130 to which the pressing cylinder 122 may be mounted and fixed. The column unit 130 may include two leg portions 131 and a mounting portion 132 connected to the two leg portions 131. The two leg portions 131 may have a shape extending upward from the ground. The mounting portion 132 may be configured to be connected with upper parts of the two leg portions 131.

For example, as shown in FIGS. 4 and 6, the transfer unit 120 moves the transfer jig 121 in a downward direction so that the pressing jig 110 is transferred downward to press each of the plurality of cylindrical battery cells 200 toward the adhesive 400 (a lower direction). When the pressing is finished, the transfer unit 120 may move the transfer jig 121 upward again to return the pressing jig 110 to its original position.

Therefore, according to this configuration of the present disclosure, since the present disclosure includes the pressing jig 110 having a plurality of pressing rods 112 configured to respectively press the plurality of cylindrical battery cells 200 and configured to be partially deformed during pressing, the plurality of pressing rods 112 may press the cylindrical battery cells 200 independently, compared with the prior art in which the plurality of cylindrical battery cells 200 are pressed using an integrated pressing. Thus, even when the heights of the cylindrical battery cells 200 have steps in the upper and lower direction or the cylindrical battery cells 200 are inclined at a predetermined angle Q since the surface of the heatsink 300 is not flat, it is possible to effectively reduce the deviation of the pressing forces of the plurality of pressing rods 112.

Accordingly, the thickness of the adhesive 400 interposed between each of the plurality of cylindrical battery cells 200 and the heatsink 300 may be more uniform. Ultimately, the uniform thickness of the adhesive 400 may transfer the heat generated from each adhered cylindrical battery cell 200 to the heatsink 300 with similar heat transfer efficiency, thereby securing easy heat management of the battery module and effectively preventing the cylindrical battery cells 200 from being degraded.

Referring to FIGS. 5 to 7 again, the pressing jig 110 of the present disclosure may further include an elastic member 112b1. The elastic member 112b1 may be, for example, made of a synthetic rubber or polyurethane material. The polyurethane may have a hardness of 40° to 60°. More specifically, the hardness of the polyurethane may be 50°.

In addition, in the pressing jig 110 of the present disclosure, a portion of the pressing rod 112 may be the elastic member 112b1. For example, as shown in FIG. 6, the elastic member 112b1 may be provided at a lower part of the pressing portion 112b of the pressing rod 112. The elastic member 112b1 may be configured to directly press the upper portion of the cylindrical battery cell 200. The elastic member 112b1 may be configured to be elastically deformed in a direction opposite to the pressing direction when the upper portion of the cylindrical battery cell 200 is pressed.

Moreover, the end of the elastic member 112b1 in the pressing direction may be configured to move in the pressing direction further to the location of the pressing surface of the cylindrical battery cell 200. For example, one surface (lower surface) of the elastic member 112b1 in the pressing direction may be moved by a greater distance in the pressing direction than the distance of the cylindrical battery cell 200. For example, the lower surface of the elastic member 112b1 may be moved to a location lower by about 1 mm in height than the upper position of the cylindrical battery cell 200.

Therefore, according to this configuration of the present disclosure, in the present disclosure, since the pressing jig 110 further includes the elastic member 112b1 configured to be elastically deformed in a direction opposite to the pressing direction when pressing the cylindrical battery cell 200, compared with the prior art where the plurality of cylindrical battery cells 200 are pressed using a pressing plate made of a rigid material, the lower surface of the elastic member 112b1 may be moved in the pressing direction further to the upper position of the cylindrical battery cell 200. Thus, even when the heights of the cylindrical battery cells 200 have steps in the upper and lower direction or the cylindrical battery cells 200 are inclined at a predetermined angle Q since the surface of the heatsink 300 is not flat, it is possible to perform pressing, thereby effectively reducing the deviation of the pressing forces of the plurality of pressing rods 112.

Accordingly, in the present disclosure, the thickness of the adhesive 400 interposed between each of the plurality of cylindrical battery cells 200 and the heatsink 300 and compressed by the pressing apparatus 100 may be more uniform.

Ultimately, the uniform thickness of the adhesive 400 may allow the heat generated from each adhered cylindrical battery cell 200 to be transferred to the heatsink 300 with similar heat transfer efficiency, thereby securing easy heat management of the battery module and effectively preventing the cylindrical battery cell 200 from being degraded.

Figure 8:
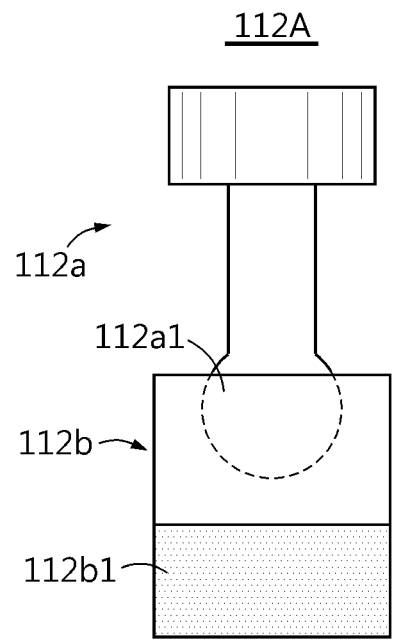
FIG. 8 is a front view schematically showing a part of the pressing apparatus according to another embodiment of the present disclosure in operation.

FIG. 8 is a front view schematically showing a part of the pressing apparatus according to another embodiment of the present disclosure in operation. Also, FIG. 9 is a partial front view schematically showing the pressing apparatus according to another embodiment of the present disclosure in operation.

Figure 9:
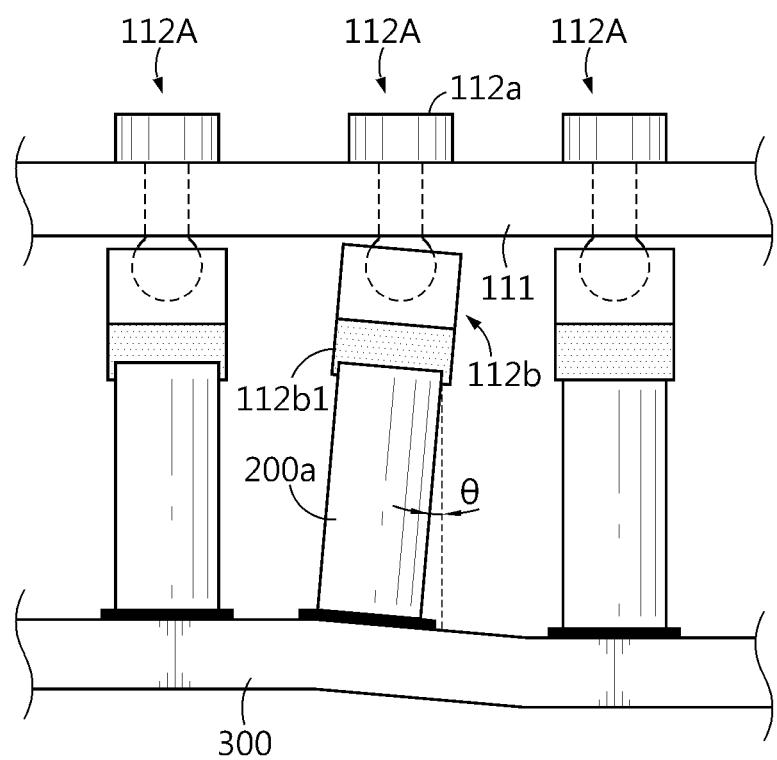
FIG. 9 is a partial front view schematically showing the pressing apparatus according to another embodiment of the present disclosure in operation.

Referring to FIGS. 8 and 9, the pressing apparatus according to another embodiment of the present disclosure may be configured such that the pressing rod 112A is rotatable, compared with the pressing apparatus 100 illustrated in FIG. 6. Other components of the pressing apparatus 100 may be the same.

Specifically, when the cylindrical battery cell 200 is pressed, the pressing rod 112A may be configured to rotate according to an inclined angle Q of the cylindrical battery cell 200 or a slope of the pressing surface that is pressed.

More specifically, in the pressing rod 112A, a part 112a1 of the bolt portion 112a may have a spherical shape. The part of the bolt portion 112a connected to the pressing portion 112b may have a spherical shape.

The pressing portion 112b may be coupled to the spherical part 112a1 to enable rotational movement along the outer surface of the spherical part 112a1 of the bolt portion 112a.

Figure 10:
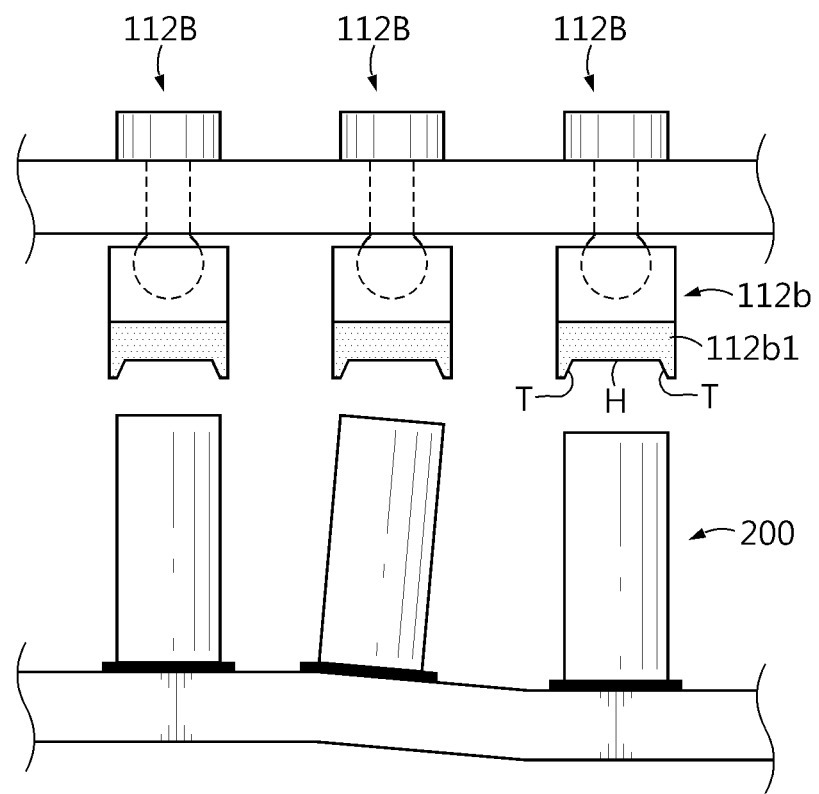
FIGS. 10 and 11 partial front views schematically showing a pressing apparatus according to still another embodiment of the present disclosure in operation.

For example, as shown in FIG. 10, when the pressing rod 112A presses the cylindrical battery cell 200 mounted on the inclined outer surface of the heatsink 300, the pressing rod 112A may be configured to rotate along the inclined surface of the upper portion of the cylindrical battery cell 200. That is, the lower surface of the elastic member 112b1 provided to the pressing portion 112a of the pressing rod 112A may rotate clockwise by the inclined surface of the upper portion of the cylindrical battery cell 200.

Therefore, according to this configuration of the present disclosure, in the present disclosure, since the pressing rod 112A is rotatably coupled along the outer surface of the spherical part 112a1 of the bolt portion 112a, it is possible to press the inclined upper surface of the cylindrical battery cell 200 whose upper portion is inclined, so that the thickness of the adhesive 400 bonded to the inclined cylindrical battery cell 200 may be uniformly formed. That is, in this embodiment, since the upper portion of the cylindrical battery cell 200 may be uniformly pressed as a whole along the inclined surface of the heatsink 300, the thickness of the adhesive 400 bonded to the inclined cylindrical battery cell 200 may be uniformly formed.

Accordingly, it is possible to prevent the heat dissipation efficiency of the plurality of cylindrical battery cells 200 from becoming non-uniform.

Figure 11:
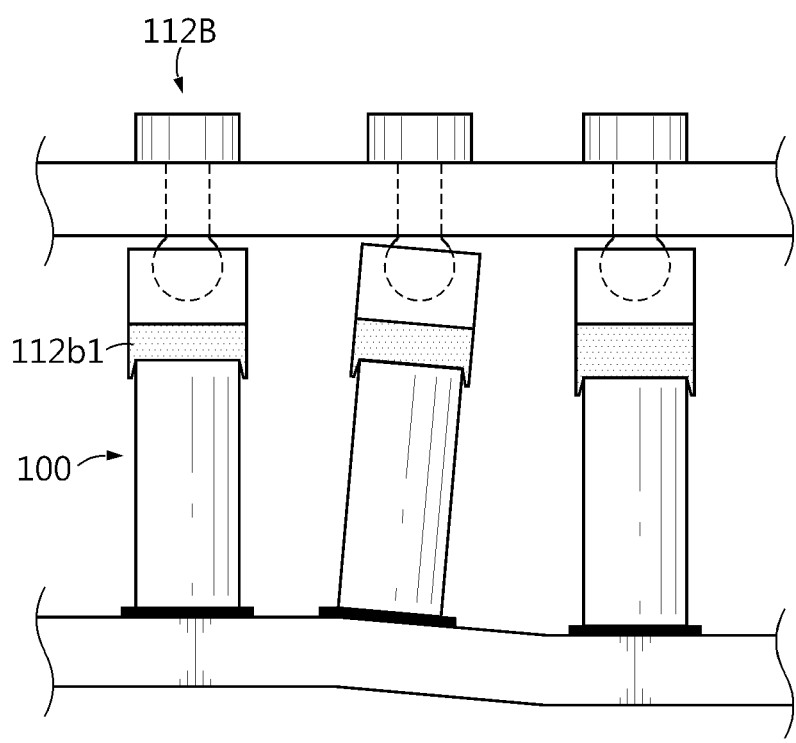

FIGS. 10 and 11 partial front views schematically showing a pressing apparatus according to still another embodiment of the present disclosure in operation.

Referring to FIGS. 10 and 11, the elastic member 112b1 provided to the pressing portion 112a of the pressing rod 112B of the pressing apparatus according to still another embodiment of the present disclosure may further have an insert groove H configured such that a portion of the cylindrical battery cell 200 is inserted therein, compared with the elastic member 112b1 of the pressing apparatus 100 of FIG. 9. Other components of the pressing apparatus 100 may be the same.

Specifically, the insert groove H may be configured such that a portion of the cylindrical battery cell 200 is inserted. For example, as shown in FIG. 10, the insert groove H may be formed by indenting the lower surface of the elastic member 112b1 in an upper direction. The insert groove H may be configured to accommodate the upper portion of the cylindrical battery cell 200 therein.

Therefore, according to this configuration of the present disclosure, in the present disclosure, since the insert groove H for accommodating a portion of the cylindrical battery cell 200 is provided to the elastic member 112b1, when the elastic member 112b1 presses the cylindrical battery cell 200, it is possible to effectively prevent the cylindrical battery cell 200 from slipping. That is, the insert groove H of the elastic member 112b1 may stably hold the upper portion of the cylindrical battery cell 200.

Accordingly, it is possible to effectively reduce the occurrence of defects in the pressing process of the pressing apparatus 100.

Moreover, a tapered portion T may be formed on the inner surface of the insert groove H. Specifically, the tapered portion T may be configured to guide insertion of the cylindrical battery cell 200 when the cylindrical battery cell 200 is inserted into the insert groove H. For example, as shown in FIGS. 10 and 11, the tapered portion T may be formed so that the inner space becomes narrower in an upper direction (an inner direction) from an inlet portion (a lower portion) of the insert groove H.

Accordingly, when the upper portion of the cylindrical battery cell 200 is inserted into the insert groove H of the elastic member 112b1, the cylindrical battery cell 200 may move into the insert groove H along the tapered portion T.

Therefore, according to this configuration of the present disclosure, in the present disclosure, since the tapered portion T is formed at the insert groove H, it is possible to effectively prevent that the cylindrical battery cell 200 in an inclined state is not inserted into the insert groove H and thus the cylindrical battery cell 200 is separated from the elastic member 112b1 or cause pressurization failure.

Figure 12:
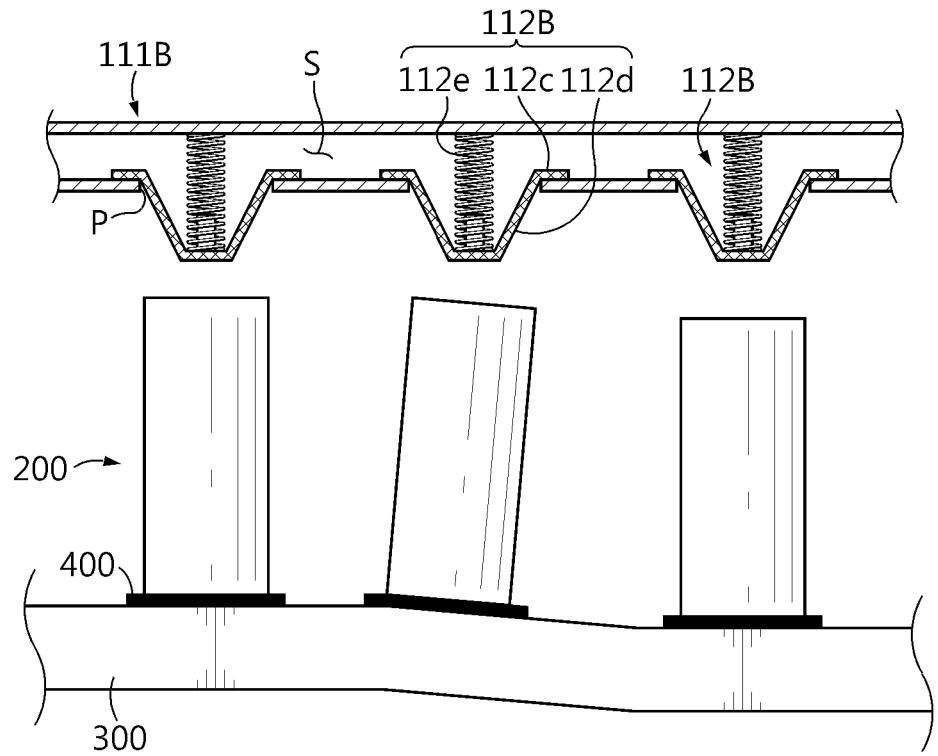
FIGS. 12 and 13 partial front views schematically showing a pressing apparatus according to further another embodiment of the present disclosure in operation.
Figure 13:
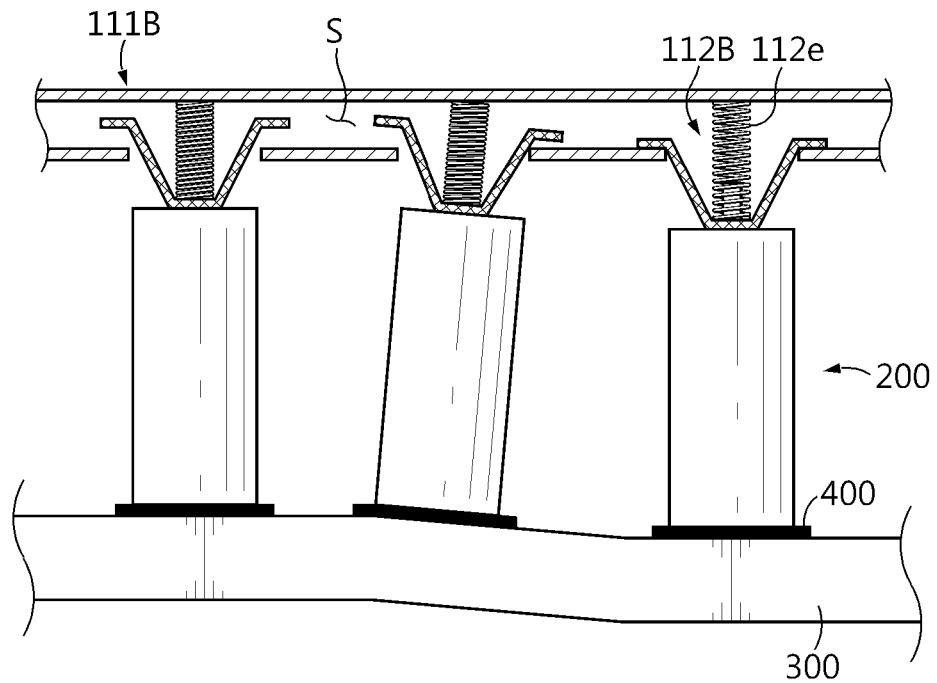

FIGS. 12 and 13 partial front views schematically showing a pressing apparatus according to further another embodiment of the present disclosure in operation.

Referring to FIGS. 12 and 13, in the pressing apparatus according to further another embodiment of the present disclosure, when compared with the pressing apparatus 100 of FIG. 6, the support plate 111B and the pressing rod 112B may have different shapes. Other components are the same, and thus the different features of the support plate 111B and the pressing rod 112B will be described.

Specifically, the support plate 111B of the pressing apparatus of FIGS. 12 and 13 may have an inner space S configured to accommodate a part of the pressing rod 112B. The inner space S may have an extra empty space so that a part of the inserted pressing rod 112B is movable.

The support plate 111B may include an insert groove P opened so that the remaining part of the pressing rod 112B may protrude outward from the inner space S. That is, the insert groove P may be formed to communicate with the inner space S so that the remaining part of the pressing rod 112B except for the located in the inner space S may protrude toward the cylindrical battery cell 200.

In addition, the pressing rod 112B may include a hanging portion 112c, a protruding portion 112d, and an elastic portion 112e. Specifically, the hanging portion 112c is configured to be hung at the insert groove P and may have a plate shape extending in a horizontal direction. For example, when the insert groove P is a circular opening, the hanging portion 112c may have a circular plate shape extending in the horizontal direction.

Moreover, the protruding portion 112d may have a shape extending from the hanging portion 112c toward the cylindrical battery cell 200 through the insert groove P. The protruding portion 112d may have a shape protruding from the insert groove P toward the cylindrical battery cell 200 to press the upper portion of the cylindrical battery cell.

The protruding portion 112d may have an accommodation space into which a part of the elastic portion 112e may be inserted. For example, as shown in FIG. 12, the protruding portion 112d may have a tubular funnel shape whose a diameter decreases in a downward direction.

In addition, one end of the elastic portion 112e may be connected to the hanging portion 112c or the protruding portion 112d. The other end of the elastic portion 112e may be connected to the inner surface of the inner space S of the support plate 111B.

The elastic portion 112e may be configured to be compressed in a direction opposite to the pressing direction, when the protruding portion 112d presses the cylindrical battery cell 200. For example, as shown in FIG. 12, the elastic portion 112e may be a spring having one end connected to the inner surface of the inner space S of the support plate 111B and the other end connected to the accommodation space of the protruding portion 112d.

Therefore, according to this configuration of the present disclosure, since the present disclosure includes the support plate 111B having an inner space and an insert groove P and the pressing rod 112B having a hanging portion 112c, a protruding portion 112d and an elastic portion 112e, the pressing rod 112B is configured to be movable in the inner space S of the support plate 111B. Thus, even when the cylindrical battery cell 200 is inclined, it is possible to press the cylindrical battery cell 200 along the inclined upper surface of the cylindrical battery cell 200, and thus the thickness of the adhesive 400 bonded to the inclined cylindrical battery cell 200 may be formed evenly. Accordingly, it is possible to prevent the heat dissipation efficiency of the plurality of cylindrical battery cells 200 from becoming non-uniform.

In addition, in the present disclosure, it is possible to effectively reduce the deviation of the pressing force of the plurality of pressing rods 112B even when there is a step or a sloped surface in the upper and lower direction. Accordingly, the thickness of the adhesive 400 interposed between each of the plurality of cylindrical battery cells 200 and the heatsink 300 may be more uniform.

Figure 14:
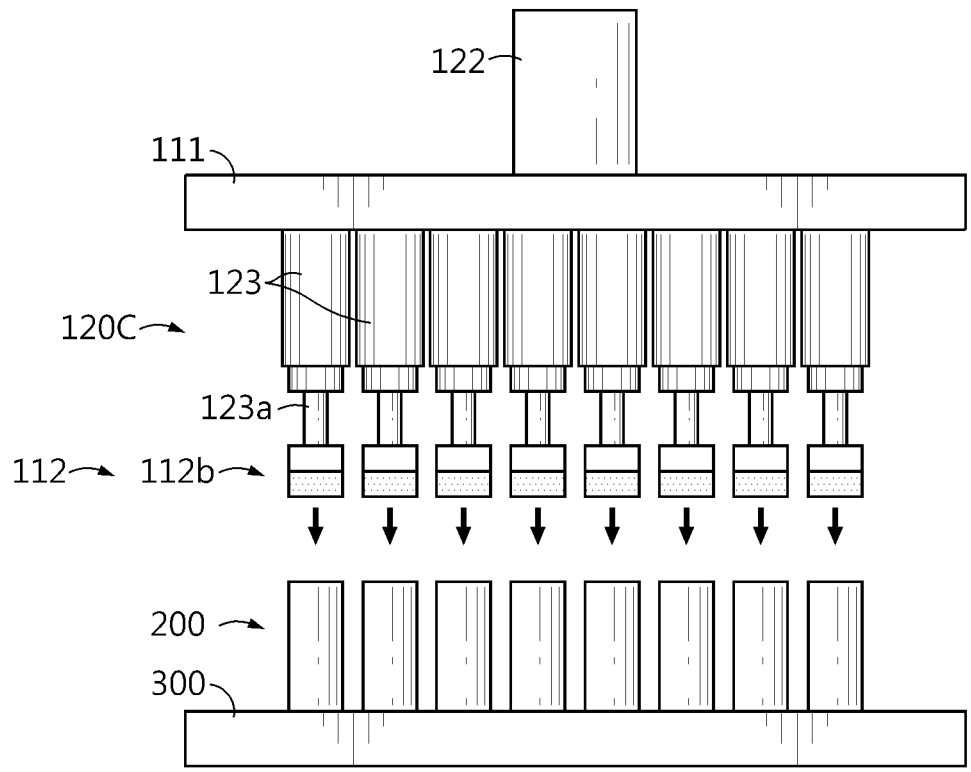
FIGS. 14 and 15 partial front views schematically showing a pressing apparatus according to still further another embodiment of the present disclosure in operation.
Figure 15:
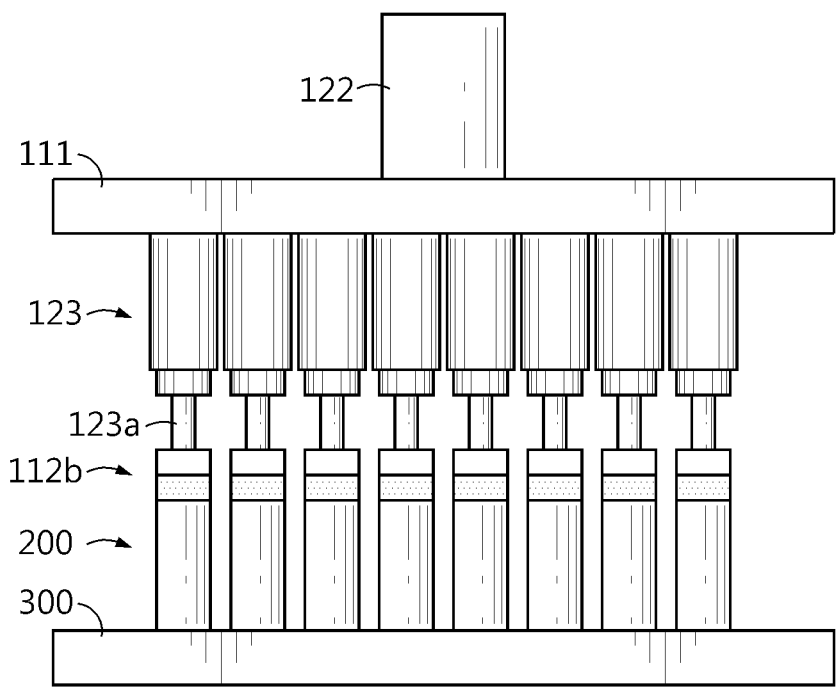

FIGS. 14 and 15 partial front views schematically showing a pressing apparatus according to still further another embodiment of the present disclosure in operation.

Referring to FIGS. 14 and 15, the pressing apparatus of FIGS. 14 and 15 is different from the pressing apparatus according to the embodiment of FIG. 6 in the configuration of the transfer unit 120C. Since the other components are the same, only components having a difference will be described here.

The transfer unit 120C of the pressing apparatus of FIGS. 14 and 15 may further include a plurality of cylinder units 123. The plurality of cylinder units 123 may be fixed to the support plate 111. For example, as shown in FIG. 14, the plurality of cylinder units 123 may be fixed to the lower surface of the support plate 111.

Also, the plurality of cylinder units 123 may be configured to transfer the plurality of pressing rods 112 toward the plurality of cylindrical battery cells 200, respectively. For example, cylinder shafts 123a of the plurality of cylinder units 123 may be connected to the plurality of pressing rods 112, respectively.

The cylinder unit 123 may move the pressing rod 112 toward the plurality of cylindrical battery cells 200 or move the pressing rod 112 away from the plurality of cylindrical battery cells 200. An end of the cylinder shaft 123a may be connected to the pressing rod 112.

In this case, unlike the pressing rod 112 of FIG. 6, the pressing rod 112 of FIG. 14 may include only a pressing portion (the same as 112b of FIG. 7) without a bolt portion. That is, each of the plurality of cylinder units 123 may be configured to be connected to each of the plurality of pressing portion 112b.

In addition, the transfer unit 120C of FIG. 14, unlike the transfer unit 120 of FIG. 4, may not include a transfer jig. Instead, the pressing cylinder 122 may be connected directly to the support plate 111.

Therefore, according to this configuration of the present disclosure, since the present disclosure includes a plurality of pressing rods 112 respectively configured to press the plurality of cylindrical battery cells 200 and a plurality of cylinder units 123 capable of moving the plurality of pressing rods 112 independently, the plurality of pressing rods 112 may independently press the cylindrical battery cells 200, as compared with the prior art where a plurality of cylindrical battery cells 200 are pressed using an integrated pressing plate. Thus, even when the heights of the cylindrical battery cells 200 have a step in the upper and lower direction or the cylindrical battery cell 200 is inclined at a predetermined angle since the surface of the heatsink 300 is not flat, the deviation of the pressing force of the plurality of pressing rods 112 may be effectively reduced.

Accordingly, the thickness of the adhesive interposed between each of the plurality of cylindrical battery cells 200 and the heatsink 300 may be more uniform.

Meanwhile, a device for manufacturing a battery module according to an embodiment of the present disclosure includes the pressing apparatus 100 and a control unit configured to control operations of the pressing apparatus 100.

Meanwhile, a method for manufacturing a battery module according to an embodiment of the present disclosure may include a method of pressing a plurality of cylindrical battery cells 200 bonded onto a module case or the heatsink 300 to which the plurality of cylindrical battery cells 200 are mounted, by using the pressing apparatus 100.

Specifically, the manufacturing method includes an applying step or operation of applying the adhesive 400 to a portion of the module case or the heatsink to which a plurality of cylindrical battery cells 200 are mounted, an attaching step or operation of attaching the plurality of cylindrical battery cells 200 to the adhesive 400 applied to the heatsink 300, and a pressing step or operation of pressing each of the plurality of cylindrical battery cells 200 toward the adhesive 400 by using the pressing apparatus 100.

Therefore, according to this configuration of the present disclosure, in the present disclosure, since a battery module is manufactured using the pressing apparatus 100 that includes a pressing jig 110 having a plurality of pressing rods 112 respectively configured to press the plurality of cylindrical battery cells 200 and configured to be partially deformed during pressing, the plurality of pressing rods 112 may press the cylindrical battery cell 200 independently, compared to the prior art where a plurality of cylindrical battery cells 200 are pressed using one pressing plate. As a result, even when the surface of the heatsink 300 is not flat and has a surface with a step or slope in the upper and lower direction, it is possible to effectively reduce the deviation of the pressing force of the plurality of pressing rods 112.

Accordingly, the thickness of the adhesive 400 interposed between each of the plurality of cylindrical battery cells 200 and the heatsink 300 may be more uniform.

Ultimately, the uniform thickness of the adhesive 400 may allow the heat generated from each adhered cylindrical battery cell 200 to be transferred to the heatsink 300 with similar heat transfer efficiency, thereby securing easy heat management of the battery module and effectively preventing the cylindrical battery cell 200 from being degraded.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A pressing apparatus for pressing a plurality of battery cells, the pressing apparatus comprising:
   a pressing jig including a support plate, and a plurality of pressing rods respectively disposed on a first side of the support plate and located to respectively face the plurality of battery cells, the plurality of pressing rods being configured to respectively press the plurality of battery cells and to adjust to some of the plurality of battery cells that are not level during pressing; and
   a transfer unit disposed on a second side of the support plate and having a transfer jig configured to transfer the support plate towards the plurality of battery cells,
   wherein each of the plurality of pressing rods includes a pressing portion,
   wherein the pressing portion includes an elastic member configured to be elastically deformed in a direction opposite to a pressing direction, when a corresponding battery cell is pressed, and
   wherein the elastic member is positioned at a part of the pressing portion pressing the corresponding battery cell so as to press the corresponding battery cell directly.

2. The pressing apparatus according to claim 1, wherein each of the plurality of pressing rods further includes:
   a bolt portion having one side fixed to the support plate, and configured to be coupled with the pressing portion.

3. The pressing apparatus according to claim 1, wherein the transfer unit is configured such that an end of the elastic member in the pressing direction is moved in the pressing direction further to a location of a pressing surface of the corresponding battery cell.

4. The pressing apparatus according to claim 1, wherein the pressing portion is configured to rotate along a slope of a pressing surface of the corresponding battery cell, when the corresponding battery cell is pressed.

5. The pressing apparatus according to claim 4, wherein the bolt portion has a spherical shape in a part coupled with the pressing portion, and
   wherein the pressing portion is coupled to rotate along an outer surface of the spherical shape of the bolt portion.

6. The pressing apparatus according to claim 4, wherein the elastic member has an insert groove formed so that a part of the corresponding battery cell is inserted therein.

7. The pressing apparatus according to claim 6, wherein a tapered portion is formed at an inner surface of the insert groove to guide insertion of the corresponding battery cell, when the corresponding battery cell is inserted into the insert groove.

8. The pressing apparatus according to claim 1, wherein the support plate includes an inner space configured to accommodate a part of the pressing rod, and an insert groove opened so that a remaining part of the pressing rod protrudes outward from the inner space.

9. The pressing apparatus according to claim 8, wherein the pressing rod includes:

a hanging portion configured to be hung at the insert groove and having a plate shape extending in a horizontal direction;

a protruding portion configured to extend towards a corresponding battery cell from the hanging portion and protrude from the insert groove towards the corresponding battery cell to press an upper portion of the corresponding battery cell; and an elastic portion having a first end connected to the hanging portion or the protruding portion and a second end connected to an inner surface defining the inner space of the support plate and configured to be compressed when the protruding portion presses the corresponding battery cell.

10. The pressing apparatus according to claim 1, wherein the transfer unit includes a plurality of cylinder units configured to transfer the plurality of pressing rods toward the plurality of battery cells, respectively.

11. The pressing apparatus according to claim 1, wherein the plurality of battery cells are provided as cylindrical battery cells.

12. A device for manufacturing a battery module, comprising the pressing apparatus according to claim 1.

13. A method for manufacturing a battery module, the method comprising:

an applying operation of applying an adhesive to a portion of a heatsink to which a plurality of battery cells are mounted;

an attaching operation of attaching the plurality of battery cells to the adhesive applied to the heatsink; and a pressing operation of pressing each of the plurality of battery cells towards the adhesive by using the pressing apparatus according to claim 1.

14. The pressing apparatus according to claim 1, wherein a portion of each of the plurality of pressing rods penetrates through the support plate.

* * * * *